(12) United States Patent
Powell et al.

(10) Patent No.: US 8,619,062 B2
(45) Date of Patent: Dec. 31, 2013

(54) TOUCH-PRESSURE SENSING IN A DISPLAY PANEL

(75) Inventors: Karlton Powell, Lake Stevens, WA (US); Steven Bathiche, Kirkland, WA (US); Timothy Large, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 435 days.

(21) Appl. No.: 13/020,722

(22) Filed: Feb. 3, 2011

(65) Prior Publication Data

US 2012/0200532 A1 Aug. 9, 2012

(51) Int. Cl.
*G06F 3/042* (2006.01)

(52) U.S. Cl.
USPC ........................................ 345/175; 178/18.09

(58) Field of Classification Search
USPC ................. 345/166, 173, 175, 176, 182, 183; 178/18.01, 18.03, 18.09, 18.11, 19.01, 178/19.05; 385/130, 131; 349/12
See application file for complete search history.

(56) References Cited

U.S. PATENT DOCUMENTS

| 8,013,845 B2 * | 9/2011 | Ostergaard et al. | 345/176 |
| 8,304,733 B2 * | 11/2012 | Alameh et al. | 250/349 |
| 8,441,467 B2 * | 5/2013 | Han | 345/176 |
| 2006/0227120 A1 | 10/2006 | Eikman | |
| 2007/0019006 A1 | 1/2007 | Marcu et al. | |
| 2008/0158641 A1 | 7/2008 | Lieb | |
| 2008/0284925 A1 * | 11/2008 | Han | 349/12 |
| 2010/0001963 A1 | 1/2010 | Doray et al. | |

OTHER PUBLICATIONS

"Flux—A Tilting Multi-Touch and Pen Based Surface", Retrieved at >>http://mi-lab.org/files/2009/04/leitner2009_chi2009_flux. pdf>>, Proceedings of the 27th international conference extended abstracts on Human factors in computing systems, Apr. 4-9, 2009, p. 1-6.
Powell, Karlton et al., "Illuminator for Touch- and Object-Sensitive Display", U.S. Appl. No. 12/621,785, filed Nov. 19, 2009, 37 Pages.

* cited by examiner

*Primary Examiner* — Abbas Abdulselam
(74) *Attorney, Agent, or Firm* — Alleman Hall McCoy Russell & Tuttle LLP

(57) ABSTRACT

A touch-pressure sensitive panel includes a locally and resiliently deformable waveguide having an exterior surface for receiving localized touch pressure from a user, and a wetting surface opposite the exterior surface. The panel also includes a de-wettable layer presenting a de-wettable surface arranged beneath the wetting surface, such that the localized touch pressure reversibly increases localized optical wetting of the de-wettable surface by the wetting surface. The panel also includes an imaging detector configured to receive light coupled into the de-wettable layer due to the localized optical wetting.

20 Claims, 4 Drawing Sheets

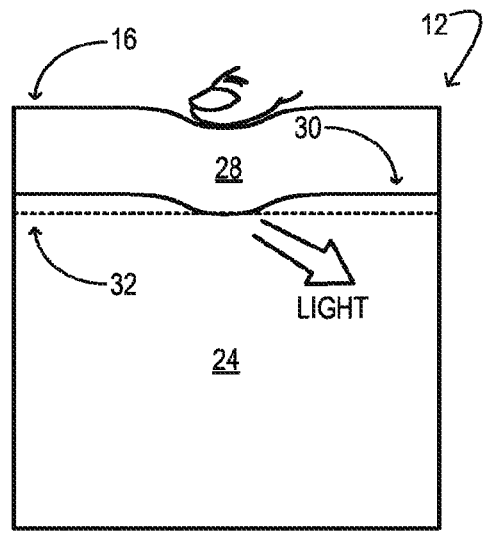 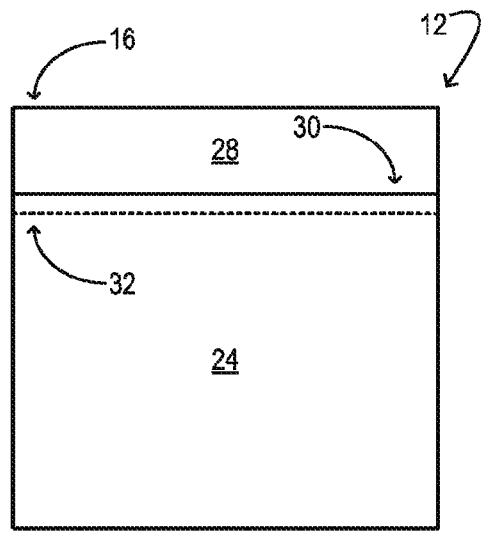
FIG. 3      FIG. 4
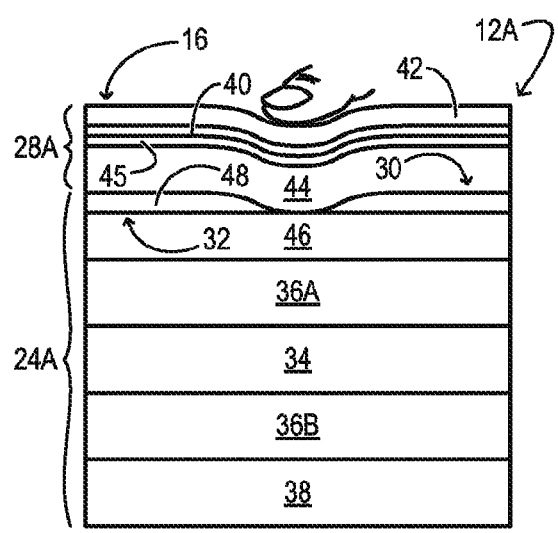 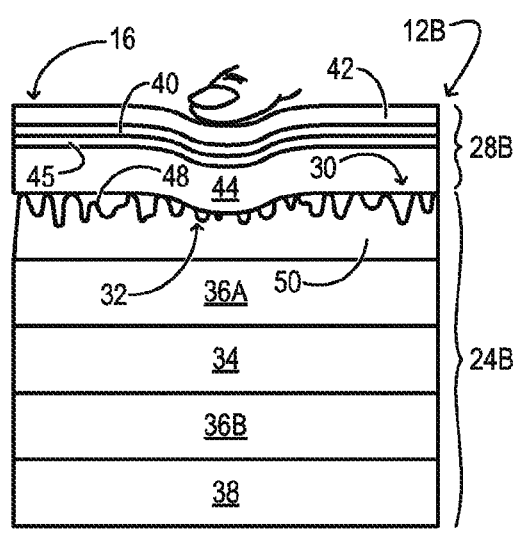
FIG. 5      FIG. 6

TOUCH-PRESSURE SENSING IN A DISPLAY PANEL

BACKGROUND

Some computer systems include an integrated display-and-input panel, such as a touch screen. This feature may be found in systems ranging from small, handheld devices to large-format, multi-user platforms. Various technologies may be combined to furnish suitable display and input functionality in the panel. For example, liquid-crystal display (LCD) technology may be combined with resistive, capacitive, or infrared (IR) vision-based input technology.

Irrespective of the technologies used, it is desirable for a display-and-input panel to exhibit high energy efficiency with respect to illumination. This consideration is relevant for handheld devices, where energy use limits battery life, and for large-format platforms, which consume significant power for illumination. Besides extending battery life and limiting energy usage, increased illumination efficiency may in some cases reduce the production cost of a display-and-input panel by reducing the number of light-emissive elements needed to provide a suitable level of illumination. These factors may be especially relevant when the input technology in the panel is vision-based, using an additional illumination source separate from that of the display.

SUMMARY

One embodiment of this disclosure provides a touch-pressure sensitive panel. The panel includes a locally and resiliently deformable waveguide having an exterior surface for receiving localized touch pressure from a user, and a wetting surface opposite the exterior surface. The panel also includes a de-wettable layer presenting a de-wettable surface arranged beneath the wetting surface. In this configuration, the localized touch pressure reversibly increases localized optical wetting of the de-wettable surface by the wetting surface. The panel also includes an imaging detector configured to receive light coupled into the de-wettable layer due to the localized optical wetting, thereby providing an input image.

The summary above is provided to introduce a selected part of this disclosure in simplified form, not to identify key or essential features. The claimed subject matter, defined by the claims, is limited neither to the content of this summary nor to implementations that address problems or disadvantages noted herein.

BRIEF DESCRIPTION OF THE DRAWINGS

FIG. 3 is a schematic, cross-sectional view of a display-and-input panel on receiving touch input from a user, in accordance with an embodiment of this disclosure.

FIG. 4 is a schematic, cross-sectional view of a display-and-input panel before or after receiving touch input from a user, in accordance with an embodiment of this disclosure.

FIGS. 5 through 8 are schematic, cross-sectional views of display-and-input panels in accordance with embodiments of this disclosure.

DETAILED DESCRIPTION

Figure 1:
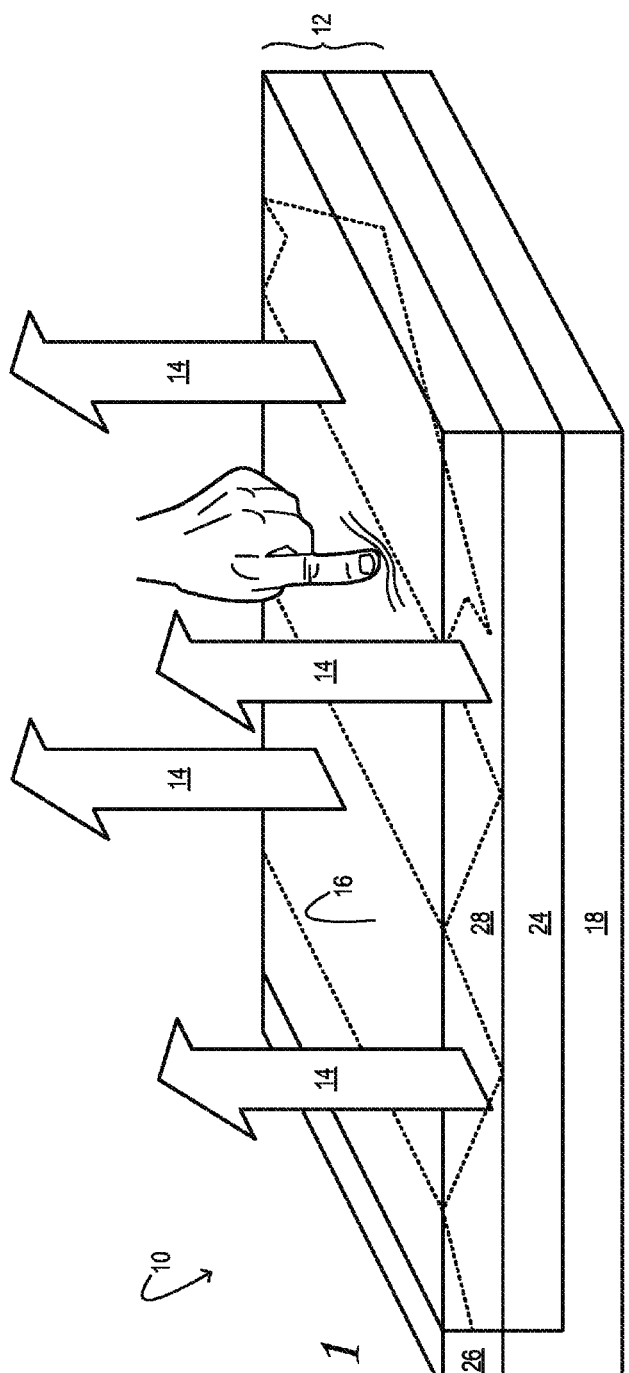
FIG. 1 shows aspects of an example computer system in accordance with an embodiment of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 shows aspects of an example computer system 10 in one embodiment. The illustrated computer system is a large-format, multi-user, surface-type computing platform. In other embodiments of this disclosure, the computer system may be a tablet or laptop computer, a portable media player, a cellular telephone, or a stationary or handheld video-game system.

Figure 2:
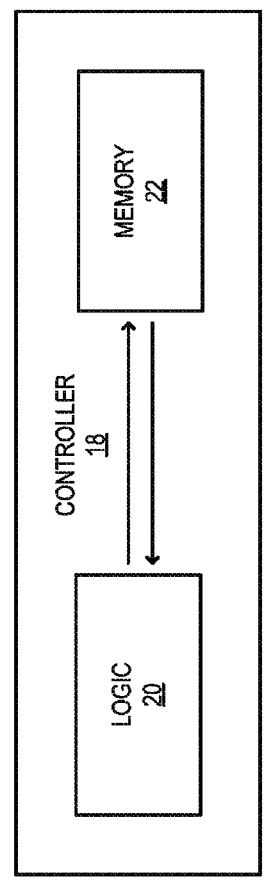
FIG. 2 shows aspects of an example controller in accordance with an embodiment of this disclosure.

Computer system 10 includes display-and-input panel 12. The panel may comprise any structure configured to form a visible display image 14 on its exterior surface 16, and to receive user input from the same exterior surface. The computer system also includes controller 18, operatively coupled to the panel. More specifically, the controller is configured to provide a control signal to the panel that causes the panel to project the display image through the exterior surface. The controller is further configured to receive from the panel an input signal reflective of the user input received at the exterior surface. Such input may comprise one or more positionally resolved touch points of a user's hand or stylus, for example. In addition to the functions noted above, controller 18 may be configured to enact any other functionality of computer system 10. To this end, the controller includes logic subsystem 20 and memory subsystem 22, as shown in FIG. 2 and further described hereinafter.

Returning now to FIG. 1, panel 12 includes image transceiver 24. The image transceiver may comprise any componentry configured to project the display image, and to receive an input image, from exterior surface 16. The input image may resolve the locations of a user's touch points on the exterior surface both positionally and temporally. Thus, the input image may be furnished as video of a resolution and frame rate suitable to reveal certain expected forms of input. Such input may include where and when a user has touched or tapped the exterior surface, run a finger or stylus along the exterior surface, let go of the exterior surface, etc. Further, the input image may reveal so-called multi-touch user input comprising more than one touch point on the exterior surface.

The input image received in image transceiver 24 may be formed using light of a predetermined wavelength band—e.g., narrow-band IR light—as an illumination source. Accordingly, the image transceiver may include one or more wavelength-selective filters matched to the predetermined wavelength band, so that light from the illumination source is detected in preference to stray or ambient light, as further described below. This approach helps to reduce interference from broadband ambient light and scattered light from display image 14. A particular advantage of using narrow-band IR light for illumination is that the chosen wavelength band may be invisible to the user.

This disclosure embraces various modes of providing narrow-band IR light as an illumination source for forming the input image. When display image 14 is gated through an LCD array, for instance, the narrow-band IR light may be emitted, along with white light for the display image, from deep within image transceiver 24. This approach takes advantage of the significant transmittance of IR light through a suitably engineered LCD array. However, due to absorption and scattering losses in the LCD array and elsewhere in the image transceiver, this approach may not offer a desirably high efficiency. The transmission efficiency of 850-nm light through an LCD array may range from 16 to 27 percent, for instance. Illumination losses may be greater still when the LCD array comprises sensor-in-pixel (SIP) technology, in which an opaque sensor element is embedded in some or all of the display elements, as described below. Further, a vision system that provides IR illumination through the LCD array may be especially prone to interference from ambient light. This is because the sensitivity of the IR-sensing pixel regions may require suppression to reduce the visibility of the ambient environment, but in so doing the optical power of the IR illumination must be increased to accommodate the loss in sensitivity. While touch-input signal-to-noise may be improved in this manner, the illumination efficiency is further reduced. In view of these disadvantages, IR light is projected from an upper layer of the image transceiver in the embodiments here described, with some embodiments including a thin, visibly transparent IR waveguide that largely preserves display contrast and color.

Continuing in FIG. 1, display-and-input panel 12 includes an illumination source and an illumination waveguide. More specifically, the panel includes edge-mounted IR light-emitting diode (IRLED) array 26 and IR waveguide 28. In one embodiment, the IRLED array may comprise ten or more LEDs evenly distributed along one edge of the waveguide. Each LED in the array may emit at a peak wavelength of 850 nanometers, for example; each may comprise a lens and/or other componentry configured to transmit its emissive output into the waveguide.

IR waveguide 28 may be transparent both to the visible light of display image 14 and to the IR light coupled thereinto. Further, the waveguide may be substantially non-scattering. As suggested pictorially in FIG. 1, light from IRLED array 26 propagates through the waveguide by total internal reflection (TIR). TIR is encouraged by the high angle of incidence of the light with respect to the upper and lower faces of the waveguide, and by the larger refractive index of the waveguide materials relative to the materials that surround the waveguide. Nevertheless, the waveguide may be engineered such that a user's touch locally frustrates or nulls the TIR condition, allowing some of the guided light to escape the waveguide, be received into image transceiver 24, and form the input image.

This disclosure embraces various modes by which a user's touch may cause some light from IR waveguide 28 to be received into image transceiver 24. For instance, the presence of a finger or stylus in contact with exterior surface 16 may cause some light to be refracted out of the waveguide at the point of contact, and scattered by the user's finger. Some of the scattered light will re-enter the waveguide at angles less than the critical angle, will pass directly through the waveguide and may be imaged in the image transceiver. This approach, while useful, admits of certain disadvantages.

First, the user may, simply by touching exterior surface 16, leave moisture, oils, and/or other residue on the exterior surface. Like the user's finger or stylus, this residue can extract and scatter light from IR waveguide 28, reducing input-image contrast and causing input artifacts. These effects may be exacerbated when the exterior surface presents a slick, low-friction coating, which may allow the residue to bead up into larger scattering regions. Second, the collection efficiency for direct touch wetting may be low because some of the extracted light is scattered back into the waveguide at high angles of incidence, and therefore may not escape the waveguide; even if the high-angle light does escape the waveguide, it may be excluded from the finitely wide acceptance of the detector in the image transceiver. Third, even for light scattered at suitably small angles, reflective losses on passing through the lower surface of the waveguide may further weaken the input-image intensity. Fourth, some of the light extracted by user touch may be re-scattered by the user's finger or hand into the ambient environment surrounding panel 12. As such light evades capture by the image transceiver, it contributes directly to vision-system efficiency loss. These disadvantages may limit the efficiencies achievable via direct touch wetting of the waveguide.

To address these issues while providing still other advantages, this disclosure describes another mode by which a user's touch may cause some light from IR waveguide 28 to be received into image transceiver 24. As described hereinafter, a user's touch input may locally actuate a light valve, which locally nulls the TIR condition and causes light from the waveguide to be coupled directly into the image transceiver. This approach avoids much of the efficiency-wasting light scatter referred to above. To this end, the waveguide may be locally and resiliently deformable, as shown in FIG. 3, such that the user's localized touch pressure on exterior surface 16 causes a wetting surface 30, opposite the exterior surface, to extend into the image transceiver. There, the wetting surface of the waveguide reversibly initiates or increases a localized optical wetting contact with a de-wettable surface 32 of the image transceiver, arranged beneath the wetting surface. Naturally, the localized optical wetting is increased directly beneath the localized touch pressure. Such contact enables or increases direct optical coupling between the waveguide and the image transceiver. Then, when the touch pressure is removed, the waveguide promptly returns to its quiescent dimensions, as shown in FIG. 4. Here, the wetting surface of the waveguide breaks or decreases wetting contact with the de-wettable surface, thereby disabling or decreasing direct optical coupling between the waveguide and the image transceiver.

Accordingly, the display-and-input panels described herein are touch-pressure sensitive; the wetting surface 30 of IR waveguide 28 together with the de-wettable surface 32 of image transceiver 24 constitute a pressure-sensitive light valve. This valve selectably allows or forbids light of virtually any angle propagating in the waveguide to transmit into the image transceiver at the location of the wetting. When the valve is open, the light received into the image transceiver due to the localized optical wetting may be imaged by an imaging detector within the image transceiver. The imaging detector may acquire and send, as input to controller 18, video in which the localized optical wetting is resolved positionally and temporally. With this configuration, light extracted from the waveguide is transmitted into the image transceiver at a high angle of incidence (e.g., 70 to 80 degrees) and without additional scatter that could degrade collection efficiency. These factors enable more light to be collected in the image transceiver in the systems presently disclosed—e.g., four to five times more—than in an otherwise comparable system in which TIR is frustrated directly by the user's touch on exterior surface 16.

In some embodiments, the efficiency increase noted above may be leveraged to enable other improvements in the design of a display-and-input panel. For instance, the sensitivity of image transceiver 24 could be reduced for a given level of ambient irradiance, as the signal corresponding to the input image would now be enhanced relative to the noise from ambient light coupled into the vision system. Further, the increased efficiency could lower the computational requirements of controller 18 directed to forming and/or processing the input image. Further still, the increased efficiency could enable a reduction in the number and/or size of the illumination sources required for suitable vision-system illumination.

FIG. 5 shows display-and-input panel 12A in a more particular embodiment. In FIG. 5, image transceiver 24A includes sensor-in-pixel (SIP) layer 34. The SIP layer may comprise a rectangular array of light-sensitive elements distributed among a rectangular array of display elements, such that both arrays reside substantially in the same geometric plane. In one embodiment, collinear rows of display and light-sensitive elements may share a common addressing line or scan line. In one embodiment, the SIP layer may include one light-sensitive element for each display pixel, such that the display-image resolution and the input-image resolution are the same; in other embodiments, the display-image resolution may be greater or less than the input-image resolution.

The light-sensitive elements of SIP layer 34 may be charge-coupled device (CCD) elements, complementary metal-oxide semiconductor (CMOS) elements, or silicon-germanium detecting regions, for example. In one embodiment, each light-sensitive element may be masked by a wavelength-selective filter element having a much lower transmittance to visible light than to the narrow-band IR light used for input-image illumination. In one embodiment, each display element may be a light-emissive element such as a color LED element (red, green, and blue, for example). In another embodiment, each display element may be a light-gating element such as a color LCD element. Each display element and each light-sensitive element may be operatively coupled to controller 18. In this manner, the controller may direct the formation of the display image and also receive and process the input image.

The SIP structure is advantageous in display-and-input panel 12A because it avoids the transmissive loss inherent in projecting vision-system illumination through the display array. For instance, a typical LCD panel may provide only 15 to 27 percent transmission at 850 nanometers. An IR backlight configured to transmit through such an array would therefore lose two-thirds to five-sixths of its intensity on a single pass through the array. The SIP configuration averts such losses, providing, in the open state of the light valve, an almost direct optical path from the source to the waveguide to the light-sensitive array elements.

In the embodiment shown in FIG. 5, SIP layer 34 is supportively sandwiched between glass sheets 36A and 36B. Robust support around the SIP layer is desirable for the display-and-input panels described herein, whose upper layers may be stress-compliant and relatively non-rigid.

In embodiments in which SIP layer 34 comprises a light-gating array, image transceiver 24A includes backlight 38. The backlight may comprise any suitable white light source—e.g. a compact fluorescent lamp, an arc lamp, an array of discrete red, green, and blue LEDs, or a white LED array. The backlight may further comprise suitable light-spreading componentry, such as an integrating envelope or cavity, an edge-lit light-guide plate (LGP), a turning film and/or diffuser sheets. In embodiments in which the SIP layer comprises a light-emissive array, the backlight may be omitted.

In the embodiment shown in FIG. 5, waveguide 28A includes wavelength-selective layer 40, configured to block at least some ambient IR light incident on exterior surface 16. In one embodiment, the wavelength-selective layer may be a dichroic layer; it may be configured to transmit visible light but to reflect IR light. In another embodiment, the wavelength-selective layer may block the ambient IR light by absorbing it. In such embodiments, interference from ambient IR light may be reduced with little impact on display-image brightness or color. The use of a wavelength-selective layer at this location is possible because, as described above, transmission of reflected IR light through exterior surface 16 is not required for forming a touch-pressure input image.

In one embodiment, wavelength-selective layer 40 may be engineered with at least some transparency to IR light, so that an emissive stylus (e.g., a light pen) may also be used to furnish input. In one embodiment, the peak emission from the stylus may differ from that of IRLED array 26. In another embodiment, the wavelength-selective layer may offer enough transparency—in the IR or elsewhere—to enable at least some resolution of objects above exterior surface 16, as further described hereinafter.

In the embodiment shown in FIG. 5, IR waveguide 28A also includes low-friction coating 42, bonded or laminated to wavelength-selective layer 40. The low-friction coating may be engineered for a slick feel as well as various other desirable properties—hardness, moisture resistance, stain resistance, glare reduction, etc. In these and other embodiments, the wavelength-selective layer and the low-friction coating may be relatively non-rigid—i.e., locally and resiliently deformable.

IR waveguide 28A also includes propagation layer 44. The propagation layer may be locally and resiliently deformable—i.e., soft and compliant to the weak mechanical stress from touch-pressure input, but returning to its quiescent shape and dimensions when the touch pressure is removed. For example, the propagation layer may be formed from a soft, compliant silicone, such as Sylgard 184 (a product of Dow Corning Company of Midland, Mich.). In other examples, a harder silicone, a clear urethane or polyurethane, a soft acrylic-elastomer based material, or a vinyl polymer such as flexible polyvinyl chloride (PVC), which can be made in a range of hardnesses, may be used. The various layers arranged above the propagation layer—wavelength-selective layer 40 and low-friction coating 42, for example—may be bonded to the propagation layer by molding, lamination, with heat and/or adhesive, or in any other suitable manner.

The layered structure of IR waveguide 28A admits of numerous variants that may be used to achieve various benefits. For example, propagation layer 44 need not comprise a single material, but may include a plurality of layers having different properties. For example, one layer of prescribed hardness and thickness may present wetting surface 30. This layer may be laminated to a slightly harder medium, which, in one configuration, would comprise the balance of the propagation layer. Thus, the propagation layer may be comprised of one or more layers of soft material. In case of plural layers, the layers may be joined with an optical adhesive, laminated, and/or molded. Such configurations may exhibit the high resiliency of the softer material along with improved de-wettability, due to reduced thickness.

In still other embodiments, wavelength-selective layer 40 may be omitted to secure certain advantages. Without the wavelength-selective layer, frustration of TIR due to touch wetting of exterior surface 16 will still provide an input signal, albeit with four to five times less intensity than the input resulting from touch-pressure actuated, direct coupling through the light valve. This feature may be used to distinguish very light touch, for example. In another embodiment, where wavelength-selective layer 40 is omitted, propagation layer 44 may include a controlled density of scattering centers arranged on its upper surface. The scattering centers may continuously extract a small amount of light from the propagation layer and scatter it upward through exterior surface 16. Such scattered light may be used as a secondary illumination source to illuminate objects hovering just above the exterior surface, so that their reflections may contribute to the input image. In this particular embodiment, an alternative or secondary wavelength-selective and/or angular-selective filter layer may be arranged beneath the waveguide to reduce loss of input-image contrast due to downward-scattering leaked light reaching the detector array. In one embodiment, the secondary filter layer may reflect such light back to objects above the exterior surface. In this scenario, various performance tradeoffs may be considered in the spectral transmission of these filter layers, so as to provide suitable signal levels for hover and touch.

Continuing in FIG. 5, IR waveguide 28A also includes low-index cladding layer 45 sandwiched between wavelength-selective layer 40 and propagation layer 44. In other embodiments, the low-index cladding layer may be used in lieu of the wavelength-selective layer. Having a lower index of refraction than the propagation phase, the low-index cladding layer may optically isolate the propagation layer from the layers above it, so as to encourage TIR in the propagation layer, and to discourage light in the propagation layer from crossing the external surface. The effects of residues accumulated on the exterior surface may be further reduced in this manner. In other embodiments, the functionality of two or more of the layers of the IR waveguide may be combined in a single layer. For example, wavelength-selective layer 40 may be omitted, and low-friction coating 42 may be formed from a low-index, optically isolating medium, thereby functioning as a cladding layer.

This disclosure embraces various modes of reversible, localized wetting between IR waveguide and image-transceiver layers in a display-and-input panel. In the embodiment shown in FIG. 5, image transceiver 24A includes smooth de-wettable layer 46 bonded or laminated to glass sheet 36A, above SIP layer 34. In this embodiment, the de-wettable layer presents a smooth, flat de-wettable surface 32, and propagation layer 44 presents a smooth, quiescently flat wetting surface 30, opposite the de-wettable surface.

Continuing in FIG. 5, a thin layer of low-index fluid 48 may be disposed between propagation layer 44 and smooth de-wettable layer 46, the low-index fluid having a lower refractive index than the propagation layer and the smooth de-wettable layer. The low-index fluid may comprise air, a polymer fluid or gel, a silicone fluid or gel, or virtually any chemically inert, optically transparent fluid. Accordingly, the refractive index of the low-index fluid may fall in the range of 1 to 1.4. Note that the higher indices within this range may place an additional constraint on the illumination light étendue for achieving high coupling efficiency into the IR waveguide. However, the refractive indices of the waveguide materials may be increased to some degree in order to loosen this constraint. Accordingly, a difference $\Delta n$ in the refractive indices of the propagation layer and the low-index fluid of greater than 0.3 may be desirable.

When no touch pressure is exerted on IR waveguide 28A, the internal pressure or incompressibility of low-index fluid 48 may provide separation between wetting surface 30 and de-wettable surface 32, such that the propagation layer remains optically uncoupled from SIP layer 34. However, when touch pressure is exerted, the low-index fluid may flow away from the touch region, allowing the wetting surface to contact the de-wettable surface, so that the propagation layer becomes optically coupled to the SIP layer. In some embodiments, an array of standoffs or other supportive structures (not shown) may also separate the propagation layer from the de-wettable layer. In some embodiments, the standoffs may hermetically seal to the propagation layer and to the de-wettable layer, forming an array of pressure pockets that separate the two layers. In these and other embodiments, the two layers may be charged with a like electrostatic charge, further promoting separation.

The display-and-input panels disclosed herein may exhibit offset, typically on order of few pixels, between the touch-pressure region and sensed position thereof, due to the high angles of incidence through which the IR light is transmitted through the light valve. Such offset may be reduced by reducing the thickness of the various layers below de-wettable surface 32. In some embodiments, the offset may be corrected in software. Further, the use of plural illumination sources coupled into more than one side (e.g., opposite sides) of the waveguide may provide a roughly symmetric offset about the touch position, maintaining touch position accuracy while adding bloom to the image. Such bloom may be limited, however, by adjusting various parameters of the de-wettable and wettable layers, including for instance, thickness.

FIG. 6 shows display-and-input panel 12B in another more particular embodiment. In FIG. 6, textured de-wettable layer 50 presents a textured de-wettable surface 32. In contrast to smooth de-wettable layer 46 of the previous embodiment, the textured de-wettable layer may be placed in direct contact with propagation layer 44, with no effort made to separate the layers. In one embodiment, the textured de-wettable layer may present a regular or irregular, 'bumpy' de-wettable surface, such as the light-diffusing surface of a surface-relief diffuser sheet. In one embodiment, the profile gradients of the textured de-wettable layer may include primarily fundamental spatial frequencies, so as to require the least touch pressure to achieve full direct wetting, while simultaneously limiting high-angle scatter of the display light. In general, 'bumpy' surfaces containing close to fundamental spatial-frequency content in their profile, and thus their output, provide more efficient light-valve coupling for a given level of touch pressure. Further, display quality may be least impacted when a randomly dimpled or 'bumpy' surface having low diffuse character is used as the textured de-wettable layer. This approach reduces the line-on-line-off (LOLO) contrast loss for the display image viewed through these layers. Although a prismatic array film having relatively sharp vertices may be used in other embodiments, such sharp vertices in the profile can have at least two adverse effects: first, a higher touch pressure may be required to achieve full-wetting; and second, there may be increased loss of contrast in the display image due to scatter induced by the surface relief.

In initial trials, 20° and 30° surface-relief diffuser sheets from Luminit, LLC (of Torrance, Calif.) performed adequately. The reader will understand, however, that the light-diffusing properties of these layers is peripheral to the objects here disclosed. Arranged below a Sylgard 184 propagation layer, the 20° sheet exhibited some lag in de-wetting response time, while the 30° sheet exhibited quick response. A harder propagation layer, such as harder silicone, polyurethane or urethane, or vinyl, may tolerate lower sag heights in the topography of the textured de-wettable surface, for faster de-wetting. Accordingly, a less optically diffusing de-wettable surface may be used in conjunction with a harder, and perhaps thinner, propagation layer, for better display-image contrast. For example, a propagation layer having hardness in the range of 60 Shore A to 75 Shore A functions reasonably well with the Luminit 30° sheet, while a propagation layer having hardness in the range of 75 Shore A to 40 Shore D functions reasonably well with a Luminit 15° or 20° sheets.

Surface tension, which is material-dependent, can also exhibit some variation on the range of hardness required for high sensitivity to pressure. For instance, use of flexible polyvinyl chloride may require a slightly different hardness to achieve the same sensitivity to touch pressure as achieved with silicone. When using a textured de-wettable layer, it is desirable that the layer impart the least contrast loss on the display image, while at the same time preserving high sensitivity to touch pressure. In one embodiment, the textured de-wettable surface may comprise media having a relatively low refractive index (e.g., n≤1.4) to help reduce scatter of display light and thus preserve display-image contrast.

In embodiments that include a textured de-wettable layer 50, an anti-reflection (AR) coating may be applied to the 'bumpy' top side of this layer in order to reduce contrast loss in the display image in presence of ambient visible light. The AR coating may reduce the amount of backscatter reflected toward the viewer, thus improving contrast in the presence of ambient light that may be present in the layers above the display array.

In this embodiment also, a low-index cladding layer may be arranged just below exterior surface 16, and a low-index fluid 48 may be disposed between textured de-wettable layer 50 and propagation layer 44. In this scenario, the amount of input light reaching the SIP layer may be limited, angularly, due to reduced acceptance of the IR waveguide. However, such acceptance may be increased in various ways—e.g., by increasing the refractive index of the waveguide with respect to the low-index fluid, or, by appropriately lowering the étendue of the illumination light sources being coupled into the edge of the waveguide, such that the light is efficiently coupled into the waveguide. It will be noted that some phenylated silicones have refractive indices as high as 1.53, while typical silicones have refractive indices near 1.4. Further, if a low-index fluid is used in conjunction with a textured de-wettable layer, or even a smooth, de-wettable layer with standoffs, a light-guiding layer having a similar refractive index may be added above the IR waveguide—e.g., just below the top layer, in order to maintain light guiding. In this scenario, for a given source size, the divergence of the IR illumination may be reduced in order to achieve étendue matching and high efficiency of coupling into the waveguide. Moreover, using a higher-index medium for the propagation layer may increase the refractive index difference between the propagation layer and its cladding layers (low-index fluid below and low-index film layer above), which may result in increased angular acceptance for the waveguide.

Note that use of a low-index cladding layer above the propagation layer that is higher than the low-index fluid below the propagation layer may allow the light to be angularly 'bucketized' within the waveguide, such that most angles of propagating light bounce between these layers, while a portion of propagating light having low angular character is allowed to transmit through the slightly higher low-index cladding to the upper layers. Such bucketizing without the use of a filter can be used to reduce the portion of light allowed to reach the upper layers above the propagation layer. When a wavelength selective filter layer is coupled just above this slightly higher low-index cladding layer, however, this portion of light may be reflected by the filter layer and thereby prevented from reaching the upper surfaces.

Although FIG. 6 shows a smooth propagation layer 44 wetting a textured de-wettable layer 50, the opposite configuration is equally embraced. That is, a textured propagation layer may be placed in direct contact with a smooth de-wettable layer. This approach may require an increase in the thickness of the propagation layer, with a different selection of materials to maintain suitable deformability in response to touch pressure. In this embodiment, the surface structures on the propagation layer may be suitably oriented to limit or prevent 'leaked' light from scattering along the propagation path. For instance, a propagation layer may support on its bottom surface a wetting layer comprising a prismatic array, with the prisms aligned orthogonal to the illumination edge. This structure may discourage 'leaked' light from scattering along the propagation path, in order to maintain a uniform touch-pressure response across the display-and-input panel. The prismatic array may exhibit a low sag height and/or a low refractive index to limit contrast loss in the display image. While the prismatic array refracts light from the display by the alternating faces, it does not randomly scatter the light; the alignment of the prisms along the propagation path may be used to prevent leaky light.

In embodiments as shown in FIG. 5, where wetting surface 30 and de-wettable surface 32 are each flat and smooth, the resolvability of images through the IR waveguide may be excellent, enabling see-through vision in addition to light-valve based touch-input detection. See-through vision may enable detection of hover—e.g., a hand, finger or stylus placed just above exterior surface 16—and input from an active stylus. In embodiments as shown in FIG. 6, however, where a textured de-wettable layer 50 is used, such input may be less resolvable, but still detectable via appropriate software, gain and integration-period adjustment, etc. IR illumination for hover detection may be provided in the form of an IR backlight unit (BLU), such as an IRLED array, one or more IRLEDs coupled through a wedge, or, an IRLED edge-lit LGP with turning film. In still other embodiments, a discrete or array-based LGP or side-lighting strip may be used, or, as described above, a 'leaky' structure coupled to the propagation layer of the IR waveguide.

With the approaches described herein, the resolvability of two adjacent touch events is a function of various parameters, which include the hardness and thickness of the propagation layer and the layers above it, and the characteristics of the de-wettable layer. Such parameters may be varied to tailor tradeoffs in performance between display and touch-input functionality. For example, a moderately hard propagation layer made of two-millimeter thick Sylgard 184 was used in conjunction with a 30° Luminit surface-relief diffuser sheet as the de-wettable layer. With these layers, it was possible to distinguish two adjacent fingernail touches separated at about three millimeters apart. However, the use of harder or thicker top-protective film or sheet layer increases the area of the wetted region, lowering the resolution. Even then, high contrast gradients in the input image, largely due to the inherent ability of direct coupling to distinguish between ambient and touch, help to distinguish wetted regions from closely spaced touch points.

In embodiments having no wavelength-selective layer disposed above propagating layer 44, sensor gain or sensitivity may be reduced for a given ambient irradiance. This strategy removes or diminishes the weaker signal due to frustrated TIR scatter from touch, while continuing to promote the stronger coupled signal from direct wetting.

While the actual sensitivity of the light-sensitive array elements of SIP layer 34 may be reduced by lowering the gain, to achieve a higher touch-signal-to-ambient ratio, another option is to reduce the effective response without adjustment of the gain. In one embodiment, sensitivity may be adjusted by adding a partially transmissive layer over the SIP layer. For example, a neutral density filter may be arranged just below smooth de-wettable layer 46. However, to reduce attenuation of the visible display image, one or more spectral filters may be used instead. For example, a discrete spectral filter may be arranged over each light-sensitive element of the SIP panel to reduce transmission at near-IR wavelengths. In another embodiment, an attenuator layer may be included, which comprises an IR-absorbing dye substantially transparent to the visible light of the display image. The dye concentration may be adjusted to achieve the desired sensitivity. In one particular embodiment, the dye may be included within textured de-wettable layer 50.

Configurations that trade sensitivity—and therefore, efficiency—to increase touch-signal-to-ambient-signal ratio offer an advantage in terms of simplicity, display color fidelity, and cost. Dichroic coatings, by contrast, may slightly alter the display color when viewed at high angles, and may add cost and complexity to the system. Anti-reflection (AR) coatings may be utilized on the surfaces of layers which interface to an air gap (or other significantly lower-index layer) to diminish the contrast loss of display performance in the presence of visible ambient light.

Figure 7:
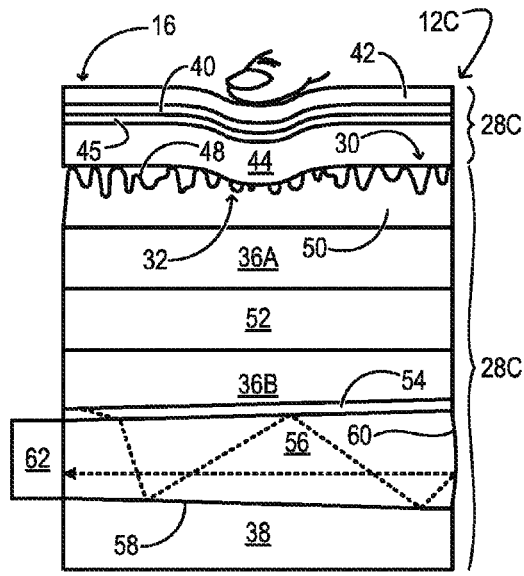
Figure 8:
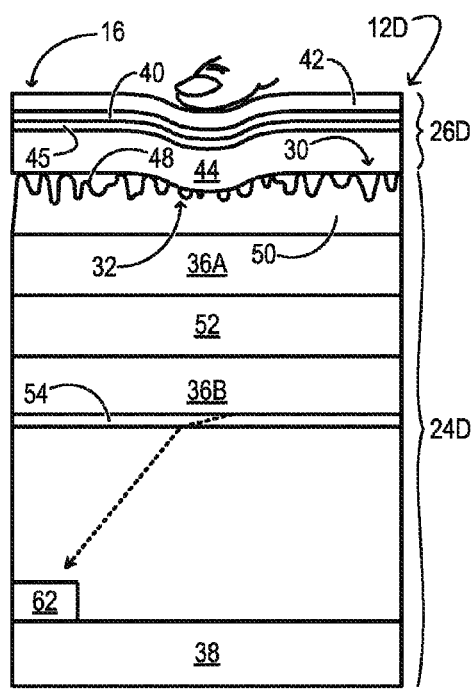

FIGS. 7 and 8 show display-and-input panels in other, more particular embodiments. Instead of an integrated SIP layer, these embodiments include an LCD array 52 and separate IR vision systems. To increase acceptance into the vision systems, diffuser 54 is coupled between the LCD array and the vision system. It will be understood, however, that in some embodiments, the diffuser may be omitted, as diffraction from the LCD cell structure itself may provide suitable low-angle content, detectable by the vision system with appropriately set camera gain, integration periods, etc. Such diffraction is especially strong due to the high angles of incidence (e.g., 70 to 80 degrees) through which the input-image light is directly coupled into the de-wettable layer via the localized light-valve approach described herein.

In the embodiment shown in FIG. 7, the IR vision system includes a wedge-shaped imaging optic 56 supporting a reflective-type turning film 58 on its lower surface. In another embodiment, a transmissive-type turning film may be arranged on the upper surface of the wedge-shaped imaging optic. The turning film, together with edge reflector 60, guide the input image to camera 62. The imaging optic accepts substantially telecentric light; therefore, some portion of the high-angle light from propagation layer 44 must be turned or scattered, or may otherwise fail to be imaged. Accordingly, diffuser 54 is arranged beneath the LCD array. The diffuser causes a portion of the high-angle light from the wetted touch region to be scattered into wedge acceptance. In another embodiment, a prismatic array may be used to turn the light downward into wedge acceptance. The combination of a prismatic turning film and a diffuser may also be used, to effect a 'diffusing turning film'. Further, a prismatic array film may be wetted to the underside of the LCD array by lamination, etc., in order to enable high-angle light that would have been reflected by TIR and subsequently absorbed, to be coupled out of TIR and exit at higher angles toward the wedge-shaped imaging optic. In this embodiment, the high-angle light may be directly coupled into the wedge without the use of turning film 58.

In the embodiment shown in FIG. 8, the IR vision system comprises a camera 62 arranged at a suitable distance beneath LCD array 52. In this embodiment, the camera is configured to directly receive IR light passing through the LCD array. The acceptance cone of the camera, though not telecentric, may still exclude much of the high-angle light received through the LCD array. Accordingly, diffuser 54 scatters a portion of the high-angle light from the wetted touch region into the acceptance cone of the camera. In one embodiment, the camera system may be made telecentric by use of a Fresnel lens arranged between the LCD array and the camera.

In the embodiments of FIGS. 7 and 8, diffuser 54 may be a volume-type diffuser, with scattering or refractive centers distributed in three dimensions, or a surface-relief type diffuser. A surface-relief diffuser may provide a limited scattering angle, advantageous for limiting contrast loss. On the other hand, the larger angular spread of a volume diffuser may allow improved uniformity and viewing angle for the display image.

In some embodiments, diffuser 54 may be switchable. For example, a polymer-dispersed liquid crystal (PDLC) or polymer-network liquid crystal (PNLC) switchable diffuser sheet may be driven, electronically, between a more diffusing state and a less diffusing (e.g., non-diffusing) state, with intermediate states in between. Imaging through the vision system with the diffuser in the more diffusing state enables light from light-valve touch-pressure wetting to be re-scattered into vision system acceptance, while imaging in the less diffusing state enables the vision system to see through the LCD panel and beyond the touch surface. Accordingly, switching between more diffusing and less diffusing states for subsequent and/or alternating frames in a prescribed pattern allows the vision system to frame-grab touch-pressure input data as well as input images from objects above the exterior surface.

In one embodiment, a vision system with a switchable diffuser may be used to look above the exterior surface to detect hover of user's hand or stylus. Such input may be used to maintain an active mode of the display-and-input panel, for example. A switchable diffuser may also be used in combination with another diffuser for improved IR touch response. For instance, a first switchable diffuser wetted to the underside of the LCD array (by lamination, etc.) may provide some additional extraction of the high-angle light beyond the LCD-structure scattered light. However, the high exiting angle of this light may be further reduced by use of a secondary switchable diffuser arranged below, with an air gap in between. In this embodiment, the use of switchable diffusers achieves redirection of a significant portion of the IR light into vision-system acceptance, yet an input image may also be acquired in a non-diffusing state of the diffuser, to enable imaging of hover beyond the exterior surface. By making use of a switchable diffuser for IR light extraction from the underside of the panel, the efficiency of IR light collection from light-valve touch-pressure sensing to the vision system may be improved in systems where the vision system is not embodied within the display layer.

In still other embodiments, the objects disposed or hovering above exterior surface 16 may be sighted using light of an entirely different wavelength range than the IR illumination source—visible light, for example. In one embodiment, the display image itself may provide underside illumination of such objects. In other embodiments, bezel and/or ambient visible lighting may be used. Accordingly, any of the above configurations may be used to provide an input image based on two contributions: (1) localized touch-pressure on exterior surface 16—viz., through direct coupling of IR light from a wetting surface of an IR waveguide to a de-wettable surface arranged beneath it; and (2) direct sighting of objects above the exterior surface using light of a different wavelength range. This embodiment is especially advantageous in cases where strong ambient IR rejection through spectral filtering is applied for improved touch-pressure resolution. Further, it leverages existing vision-system technologies (including SIP technologies) that feature broadband detectors or discrete IR and visible detector arrays. In this manner, the imaging detector may be specifically configured to receive visible light reflected from objects disposed or hovering above the exterior surface. By using the IR detectors for touch-pressure detection and the visible sensors for objects above the touch surface, it may be possible to independently optimize the performance of each mode of detection.

The configurations described above enable various methods for receiving input from a user of a touch-pressure sensitive panel. Accordingly, some such methods are now described, by way of example, with continued reference to the above configurations. It will be understood, however, that the methods here described, and others fully within the scope of this disclosure, may be enabled by other configurations as well. Naturally, each execution of a method may change the entry conditions for a subsequent execution and thereby invoke a complex decision-making logic. Such logic is fully contemplated in this disclosure. Further, some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 9:
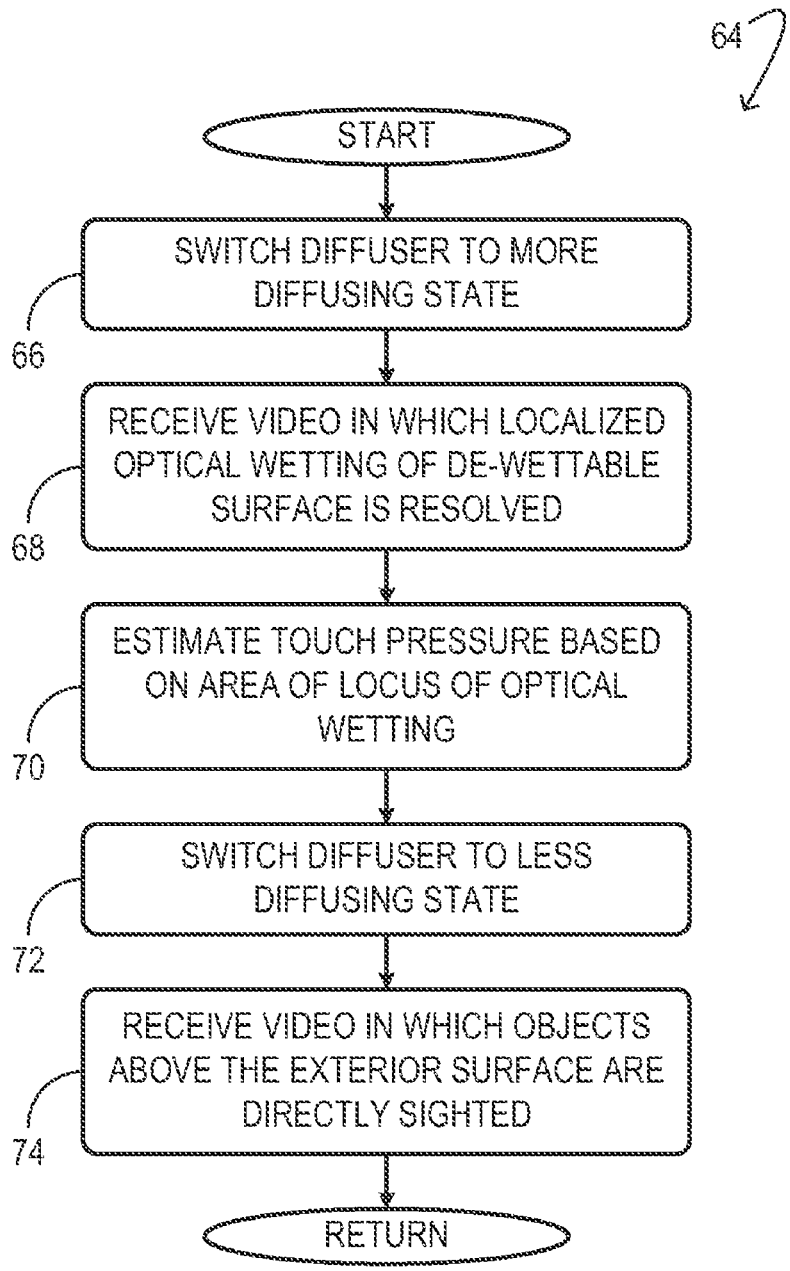
FIG. 9 illustrates an example method for receiving input from a user of a touch-pressure sensitive panel in accordance with an embodiment of this disclosure.

FIG. 9 illustrates an example method 64 for receiving input from a user of a touch-pressure sensitive panel. The panel may be a display-and-input panel having an LCD array, a separate vision system, and a diffuser switchable between a more diffusing state and a less diffusing state, as described above in the context of FIGS. 7 and 8.

At 66 of method 64, the diffuser is switched to the more diffusing state, desirable for imaging the light extracted from an IR waveguide by localized optical wetting of a de-wettable layer. At 68 video is received in which the localized optical wetting is resolved. Such video may be furnished as input to a controller operatively coupled to the panel. At 70 the user's touch pressure on the exterior surface of the waveguide is estimated based on area of the resolved optical wetting.

In some embodiments, the intensity of the IR touch signal may increases with an increase in touch pressure up to the point of saturation of the imaging system pixels, such that the relative intensity over time, or the relative intensity per ambient background over time may also be used to determine relative touch pressure, which may be used to determine adjustments of the parameters of features or modes in the display-and-input panel. Beyond the point of saturation, the width of the touch image becomes the significant quantifier. Although touch width varies from finger to finger and user to user, the relative width for a given identified touch may be used to gain relative pressure information. For instance, a relatively larger wetting region may indicate that the user is pressing hard on the waveguide, while a relatively smaller region may indicate that the user is lightly touching the waveguide. The controller may be configured to interpret such differences in touch pressure as different forms of input. At 72 the diffuser is switched to a less diffusing state, desirable for direct vision through the exterior surface, for resolving a user's hand hovering over the external surface, etc. At 74 video is received in which objects above the exterior surface are directly sighted by the vision system. In one embodiment, a gain and/or integration period of a camera coupled in the vision system may be increased when the diffuser is switched to the less diffusing state, in view of the lower input-image intensity for see-through vision relative to direct optical coupling from touch-pressure induced optical wetting.

Alternatively, illumination for hover images having peak a emission wavelength that differs from that of the illumination used for touch images may be used in conjunction with a multi-notch, band pass, or low-pass filter layer, so as to allow see-through hover images at an improved transmission efficiency. For instance, a dichroic filter layer may be designed to reflect high-angle IR light at 940 nm for touch-pressure light-valve detection, while allowing higher normal transmission of IR light of a lower peak wavelength (such as 850 nm), as well as good transmission for visible light. This configuration may allow see-through imaging of near IR as well as visible light. Further, illumination lighting for the near IR may be provided by illumination in the bezel of the display or through the display panel array. For the case of illumination placed in the bezel, the bezel may be made to appear opaque to the viewer while transmissive for the near IR illumination light by forming the bezel cover from materials such as a polymer sheet or sheets having screen-printed ink which includes an IR-transparent but visible-absorbing dye. By making use of illumination in the bezel, illumination of objects hovering above the surface may be more efficient. From 74 the method returns.

As noted above, the methods and functions described herein may be enacted via computer system 10, shown schematically in FIG. 2. Through operative coupling of logic subsystem 20 and memory subsystem 22, the computer system may be configured to enact any method—i.e., computation, processing, or control function—described herein.

More specifically, memory subsystem 22 may hold instructions that cause logic subsystem 20 to enact the various methods. To this end, the logic subsystem may include one or more physical devices configured to execute instructions. For example, the logic subsystem may be configured to execute instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors configured to execute software instructions. Additionally or alternatively, the logic subsystem may include one or more hardware or firmware logic machines configured to execute hardware or firmware instructions. The logic subsystem may optionally include components distributed among two or more devices, which may be remotely located in some embodiments.

Memory subsystem 22 may include one or more physical, non-transitory, devices configured to hold data and/or instructions executable by logic subsystem 20 to implement the methods and functions described herein. When such methods and functions are implemented, the state of the memory subsystem may be transformed (e.g., to hold different data). The memory subsystem may include removable media and/or built-in devices. The memory subsystem may include optical memory devices, semiconductor memory devices, and/or magnetic memory devices, among others. The memory subsystem may include devices with one or more of the following characteristics: volatile, nonvolatile, dynamic, static, read/write, read-only, random access, sequential access, location addressable, file addressable, and content addressable. In one embodiment, the logic subsystem and the memory subsystem may be integrated into one or more common devices, such as an application-specific integrated circuit (ASIC) or so-called system-on-a-chip. In another embodiment, the memory subsystem may include computer-system readable removable media, which may be used to store and/or transfer data and/or instructions executable to implement the herein-described methods and processes.

The terms 'module' and/or 'engine' are used to describe an aspect of computer system 10 that is implemented to perform one or more particular functions. In some cases, such a module or engine may be instantiated via logic subsystem 20 executing instructions held by memory subsystem 22. It will be understood that different modules and/or engines may be instantiated from the same application, code block, object, routine, and/or function. Likewise, the same module and/or engine may be instantiated by different applications, code blocks, objects, routines, and/or functions in some cases.

As shown in FIG. 2, computer system 10 may include components of a user interface, such as a display. The display may provide a visual representation of data held by memory subsystem 22. As the herein-described methods and processes change the data held by the memory subsystem, and thus transform the state of the memory subsystem, the state of the display may likewise be transformed to visually represent changes in the underlying data. The display may include one or more display devices utilizing virtually any type of technology. Such display devices may be combined with logic subsystem 20 and/or memory subsystem 22 in a shared enclosure, or such display devices may be peripheral display devices.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A touch-pressure sensitive panel, comprising:
a locally and resiliently deformable waveguide having an exterior surface for receiving localized touch pressure from a user, and a wetting surface opposite the exterior surface;
a de-wettable layer presenting a de-wettable surface arranged beneath the wetting surface, such that the localized touch pressure reversibly increases localized optical wetting of the de-wettable surface by the wetting surface; and
an imaging detector configured to receive light coupled into the de-wettable layer due to the localized optical wetting.

2. The panel of claim 1, wherein the localized optical wetting is increased directly beneath the localized touch pressure.

3. The panel of claim 1, further comprising a controller configured to receive, from the imaging detector, video in which the localized optical wetting is resolved positionally and temporally.

4. The panel of claim 3, further comprising an array of light-gating or light-emissive elements arranged beneath the de-wettable layer and configured to form a visible display image as directed by the controller.

5. The panel of claim 4, wherein the array comprises an LCD array, and wherein a diffuser is arranged beneath the array and configured to scatter light transmitted through the array to a camera.

6. The panel of claim 5, further comprising a wedge-shaped imaging optic supporting a turning film, wherein the optic is disposed beneath the array and configured to direct the light transmitted through the array to the camera.

7. The panel of claim 5, wherein the camera is positioned beneath the array and configured to directly receive infrared light passing through the array.

8. The panel of claim 5, wherein the diffuser is electronically switchable at least between a more diffusing state and a less diffusing state, and wherein the controller is further configured to:
switch the diffuser to the more diffusing state so as to receive from the camera an image positionally resolving the localized touch pressure from the user; and
switch the diffuser to the less diffusing state so as to receive from the camera an image positionally resolving a non-touch input from the user.

9. The panel of claim 4, wherein the imaging detector includes an array of light-sensitive elements coplanar to the array of light-gating or light-emissive elements.

10. The panel of claim 1, further comprising an illumination source configured to emit narrow-band infrared light, which is transmitted into the waveguide.

11. The panel of claim 1, wherein the waveguide includes a locally deformable propagation layer in which light propagates by total internal reflection, and, disposed above the propagation layer, a wavelength-selective layer configured to block at least some ambient infrared light incident on the exterior surface.

12. The panel of claim 11, wherein the wavelength-selective layer is configured to transmit visible light, and wherein the imaging detector is further configured to receive visible light reflected from objects disposed or hovering above the exterior surface.

13. The panel of claim 1, further comprising a fluid disposed between the wetting surface and the de-wettable surface, wherein the fluid has a lower refractive index than the propagation layer and the de-wettable layer.

14. The panel of claim 1, wherein the wetting surface and the de-wettable surface are smooth, flat surfaces when not deformed.

15. The panel of claim 14, wherein the wetting surface is separated from the de-wettable surface by one or more of a standoff, an electrostatic force, and an internal pressure or incompressibility of a fluid disposed between the wetting surface and the de-wettable surface.

16. The panel of claim 1, wherein one or both of the wetting surface and the de-wettable surface is a textured surface.

17. A method for receiving input from a user of a touch-pressure sensitive panel, the method comprising:
receiving, from an imaging detector in the panel, video in which a localized optical wetting of a de-wettable surface is resolved positionally and temporally, the localized optical wetting caused by a localized touch pressure received on an exterior surface of a locally and resiliently deformable waveguide having a wetting surface opposite the exterior surface,
wherein the de-wettable surface is arranged directly beneath the wetting surface, such that the localized touch pressure reversibly increases the localized optical wetting of the de-wettable surface by the wetting surface.

18. The method of claim 17, further comprising discriminating among two or more levels of touch pressure based on one or more of a relative intensity and an area of a region of the optical wetting from the video.

19. A touch-pressure sensitive panel, comprising:
a locally and resiliently deformable waveguide having an exterior surface for receiving localized touch pressure from a user, and a wetting surface opposite the exterior surface;
a de-wettable layer presenting a textured de-wettable surface arranged beneath the wetting surface, such that the localized touch pressure reversibly increases localized optical wetting of the de-wettable surface by the wetting surface;

an illumination source configured to emit narrow-band infrared light, which is transmitted into the waveguide;

an array of light-gating or light-emissive elements arranged beneath the de-wettable layer and configured to form a visible display image;

an imaging detector configured to receive light coupled into the de-wettable layer due to the localized optical wetting, the imaging detector comprising an array of light-sensitive elements coplanar to the array of light-gating or light-emissive elements; and a controller configured to direct the array of light-gating or light-emissive elements to form the display image and to receive, from the imaging detector, video in which the localized optical wetting is resolved positionally and temporally.

20. The panel of claim 19, wherein the waveguide includes a locally deformable propagation layer in which light propagates by total internal reflection, and one or more of:

a wavelength-selective layer arranged over the propagation layer and configured to block at least some ambient infrared light incident on the exterior surface;

a cladding layer of lower refractive index than the propagation layer arranged over the propagation layer and configured to discourage light in the propagation layer from crossing the external surface; and a fluid of lower refractive index than the propagation layer arranged beneath the propagation layer and above the textured de-wettable layer.

* * * * *